(12) United States Patent
Lee

(10) Patent No.: US 9,904,302 B2
(45) Date of Patent: Feb. 27, 2018

(54) PROACTIVE PRESSURE STABILIZING SYSTEM AND METHOD

(71) Applicants: Chunyu Wu, Matawan, NJ (US); Hsin-Hui Lee, Keelung (TW)

(72) Inventor: Hsin-Hui Lee, Keelung (TW)

(*) Notice: Subject to any disclaimer, the term of this patent is extended or adjusted under 35 U.S.C. 154(b) by 0 days.

(21) Appl. No.: 15/101,912

(22) PCT Filed: Jan. 3, 2015

(86) PCT No.: PCT/US2015/010077
§ 371 (c)(1),
(2) Date: Jun. 5, 2016

(87) PCT Pub. No.: WO2015/105734
PCT Pub. Date: Jul. 16, 2015

(65) Prior Publication Data
US 2016/0313746 A1    Oct. 27, 2016

Related U.S. Application Data

(60) Provisional application No. 61/925,218, filed on Jan. 8, 2014, provisional application No. 62/030,671, filed on Jul. 30, 2014.

(51) Int. Cl.
*F16K 31/145* (2006.01)
*G05D 16/20* (2006.01)
(Continued)

(52) U.S. Cl.
CPC .......... *G05D 16/2066* (2013.01); *F17D 1/02* (2013.01); *F17D 3/01* (2013.01)

(58) Field of Classification Search
CPC ......... G05D 16/2066; F17D 1/02; F17D 3/01; Y10T 137/2981; Y10T 137/3127;
(Continued)

(56) References Cited

U.S. PATENT DOCUMENTS 337,461 A * 3/1886 Truesdell ............... G05D 16/10
137/505.22
1,622,151 A * 3/1927 Joyce ................. G05D 16/0677
137/315.05
(Continued)

FOREIGN PATENT DOCUMENTS

TW    M331043 U    4/2008
TW    201016297 A    5/2010

*Primary Examiner* — Minh Le
(74) *Attorney, Agent, or Firm* — IPR Works, LLC

(57) ABSTRACT

System and method for gas pressure stabilization. The system comprises a pressure stabilizer which is divided into a receiving chamber and a pressure chamber by a flexible membrane, a booster device, a gas divider, and a control driver that can sense movement of the flexible membrane and control the gas divider accordingly. A pressure pilot is used to set the desired pressure in the pressure chamber. The pressure of the receiving chamber will stabilize to be the same with that of the pressure chamber regardless of the gas flow change or gas pressure change at the gas source, or the pressure fluctuation in the downstream system. The gas passing the system can eventually be recycled to a recycling system in the downstream without harming the environment.

12 Claims, 18 Drawing Sheets

(51) Int. Cl.
*F17D 1/02* (2006.01)
*F17D 3/01* (2006.01)

(58) Field of Classification Search
CPC ......... Y10T 137/5994; Y10T 137/7787; Y10T 137/7788; Y10T 137/7791; Y10T 137/782; Y10T 137/7811; Y10T 137/7822; Y10T 137/85978; Y10T 137/85986; Y10T 137/7762
USPC ......... 137/488, 505.36, 505.28, 505.38, 170, 137/500, 501, 503
See application file for complete search history.

(56) References Cited

U.S. PATENT DOCUMENTS

| | | | | |
|---|---|---|---|---|
| 2,816,561 | A * | 12/1957 | Krueger | G05D 16/0602 137/505.12 |
| 3,223,116 | A * | 12/1965 | Criddle | F16K 7/00 137/505.13 |
| 4,798,521 | A | 1/1989 | Schmidt | |
| 5,239,492 | A | 8/1993 | Hartwig | |
| 5,758,686 | A * | 6/1998 | Ohtsuka | G05D 7/005 137/488 |
| 6,418,956 | B1 * | 7/2002 | Bloom | G05D 16/185 137/14 |
| 9,110,475 | B2 * | 8/2015 | Simpson | B64D 13/04 |
| 9,261,086 | B2 * | 2/2016 | Takai | B60S 1/481 |
| 2008/0000531 | A1 * | 1/2008 | Robb | G05D 16/166 137/488 |
| 2009/0107562 | A1 | 4/2009 | Wang | |
| 2009/0308337 | A1 * | 12/2009 | Imhof | F01M 13/0011 123/41.86 |
| 2011/0185772 | A1 * | 8/2011 | Ruthven | D06F 37/225 68/12.02 |
| 2013/0014560 | A1 | 1/2013 | Wei | |

* cited by examiner

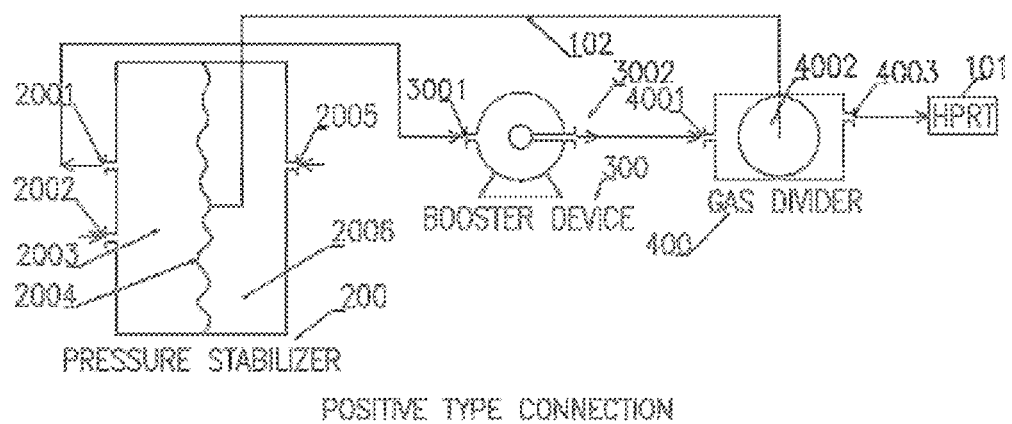
POSITIVE TYPE CONNECTION
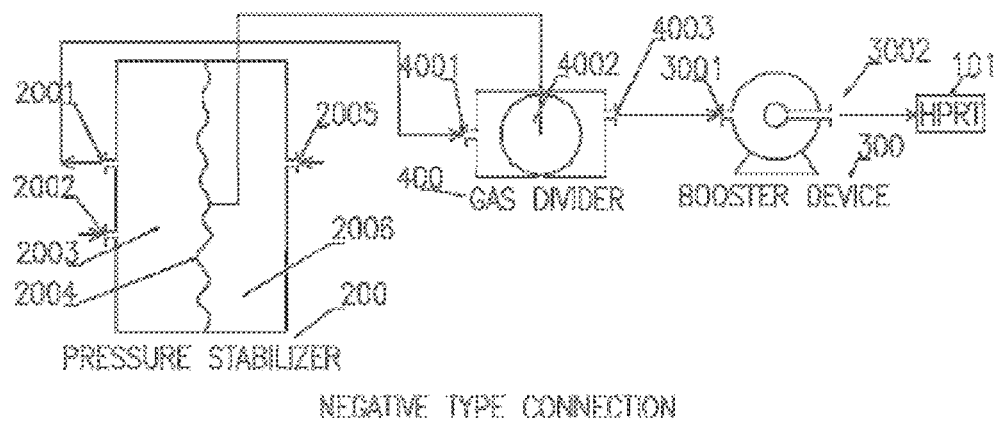
NEGATIVE TYPE CONNECTION
(FIGURE 1) TWO TYPE PPSS CONNECTION

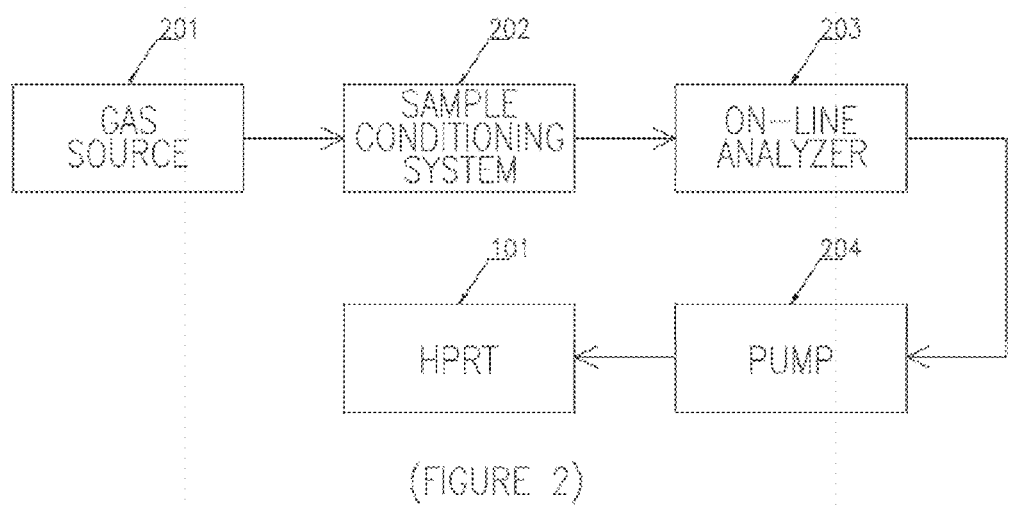
(FIGURE 2)

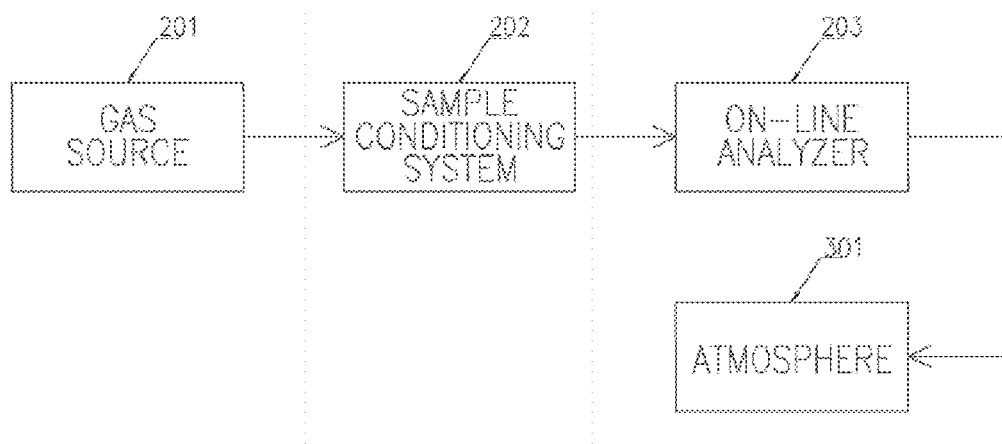
(FIGURE 3)

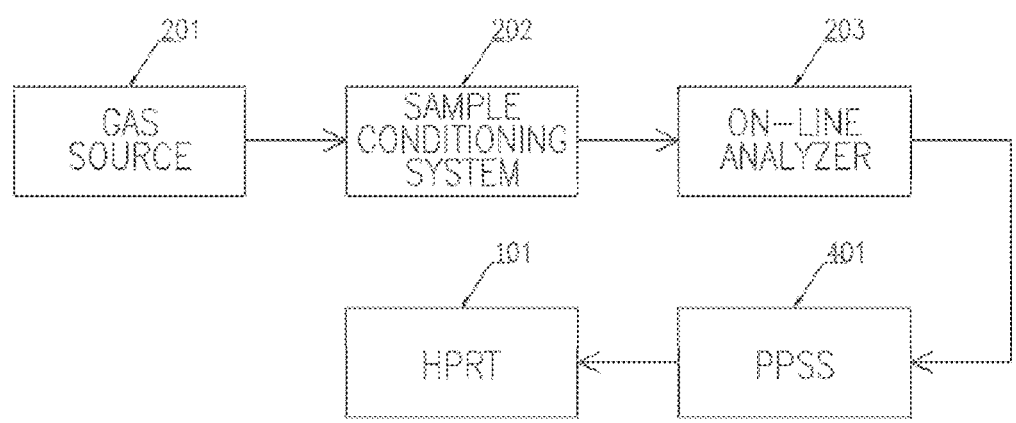
(FIGURE 4)

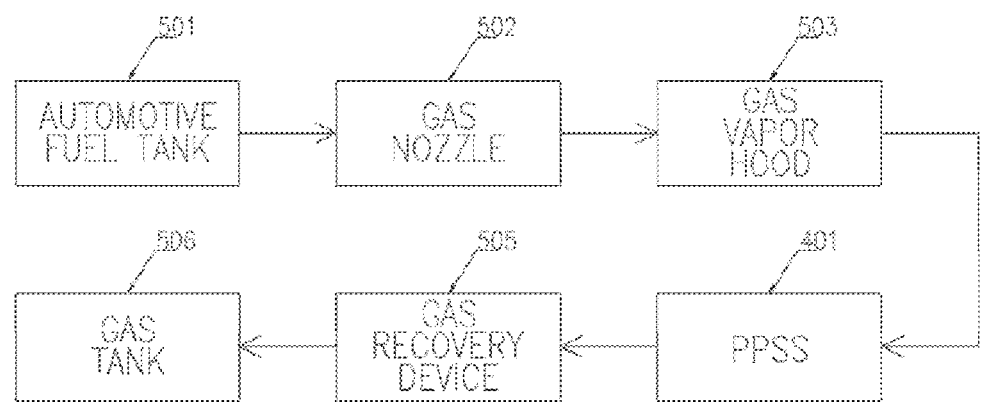
(FIGURE 5)

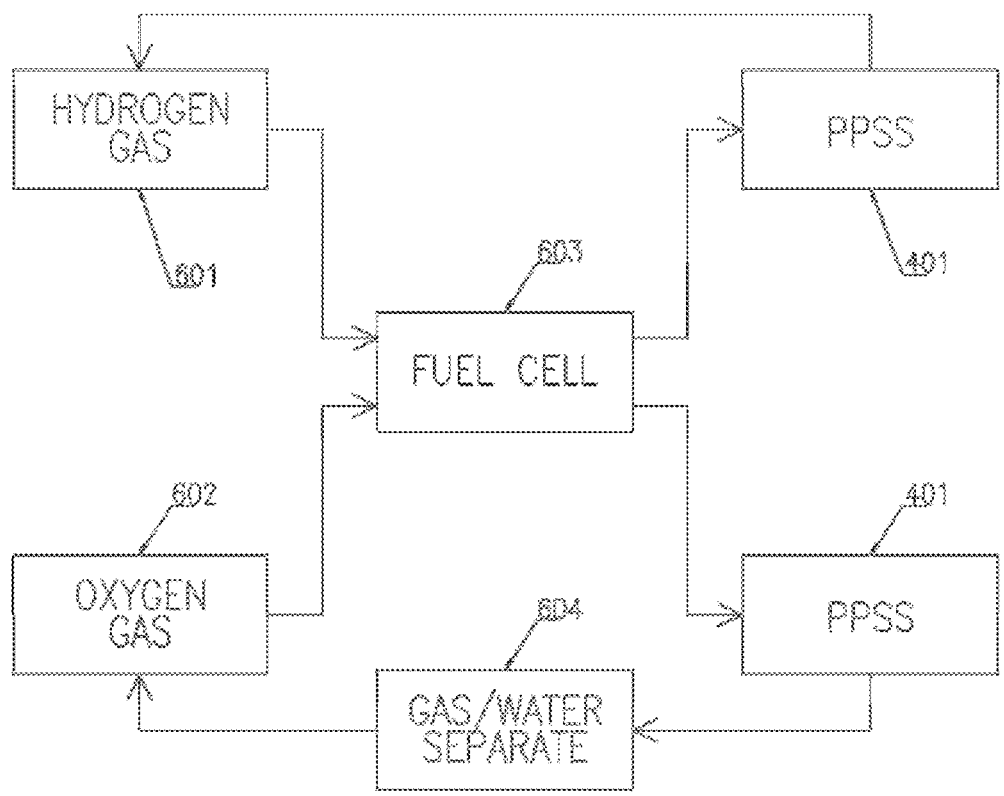
(FIGURE 6)

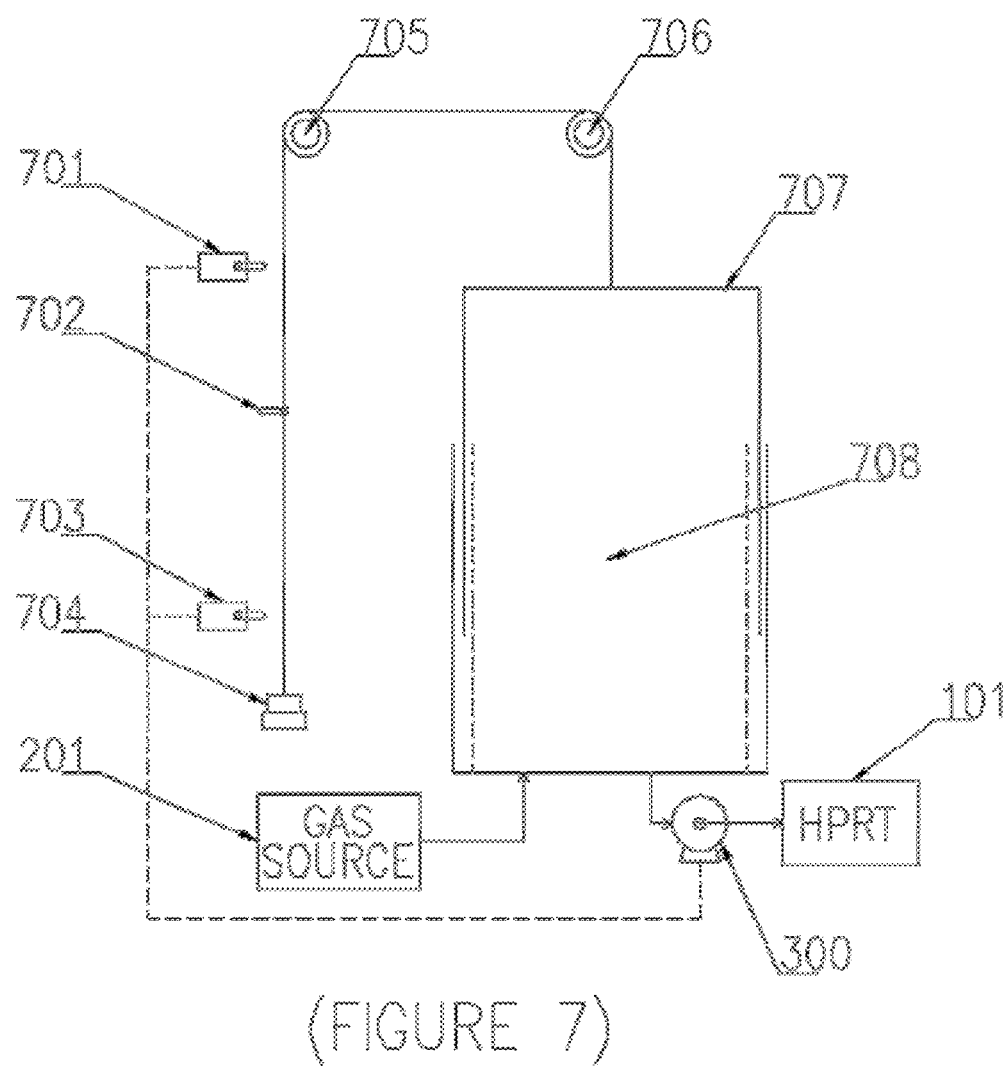
(FIGURE 7)

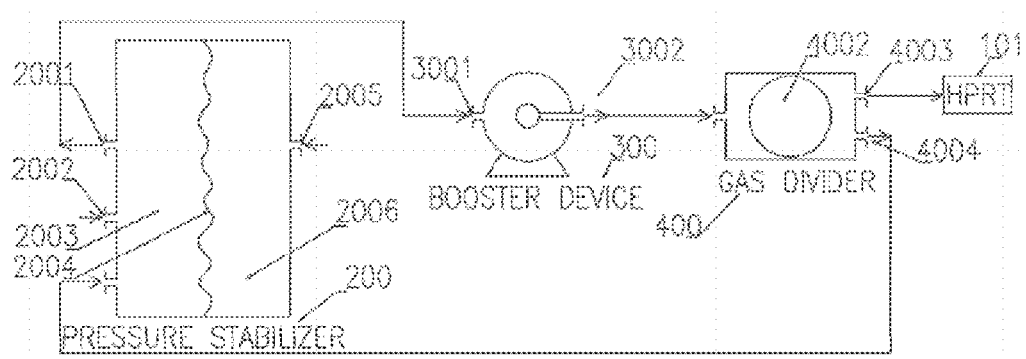
(FIGURE 8) POSITIVE TYPE CONNECTION WITH GAS REFLUX LOOP

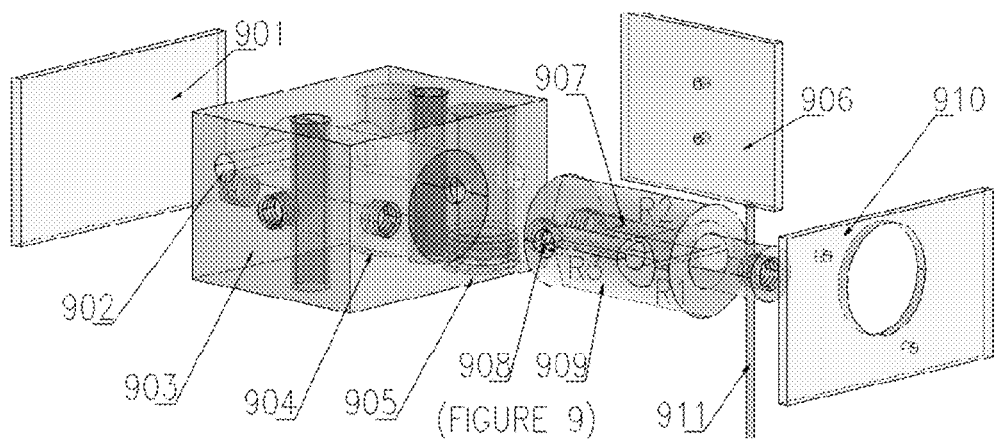

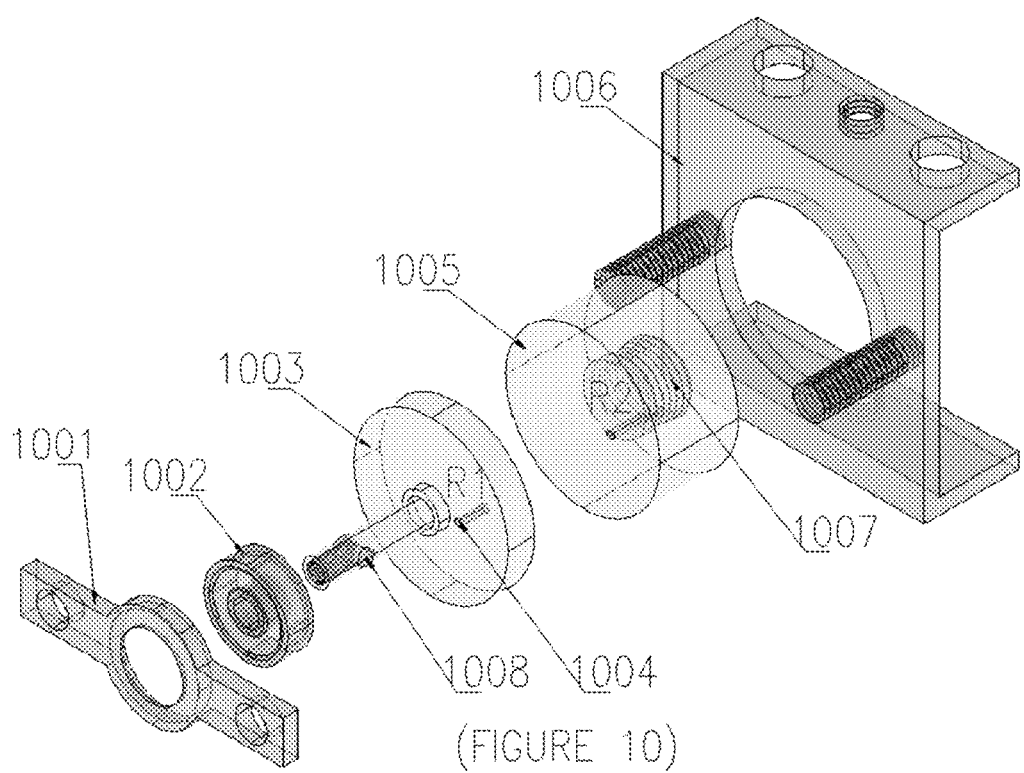
(FIGURE 10)

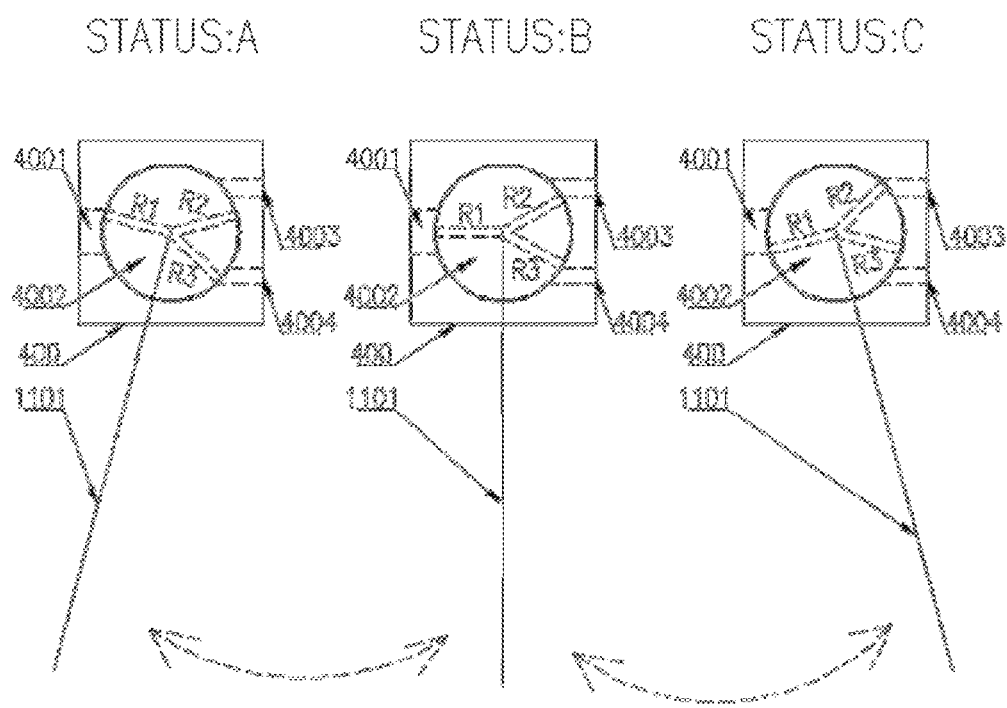
(FIGURE 11)

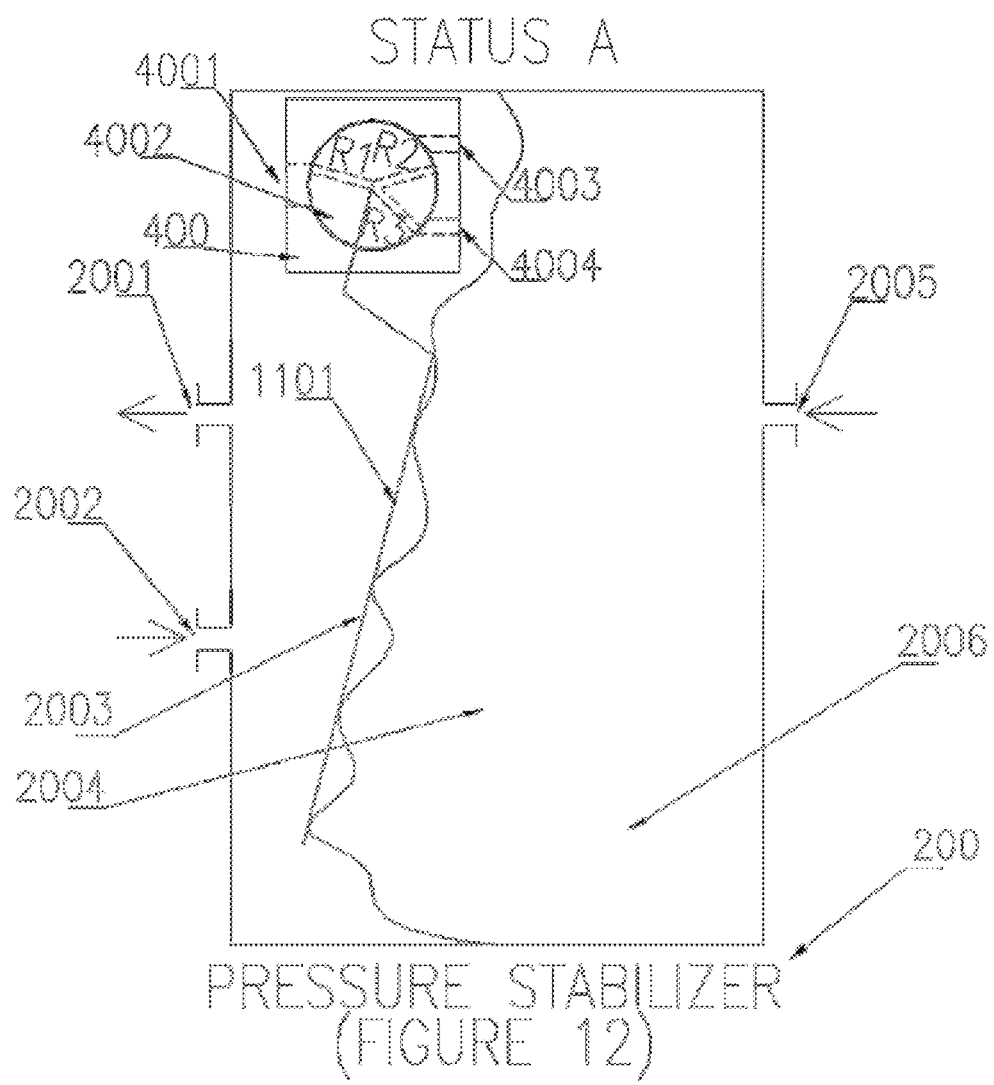

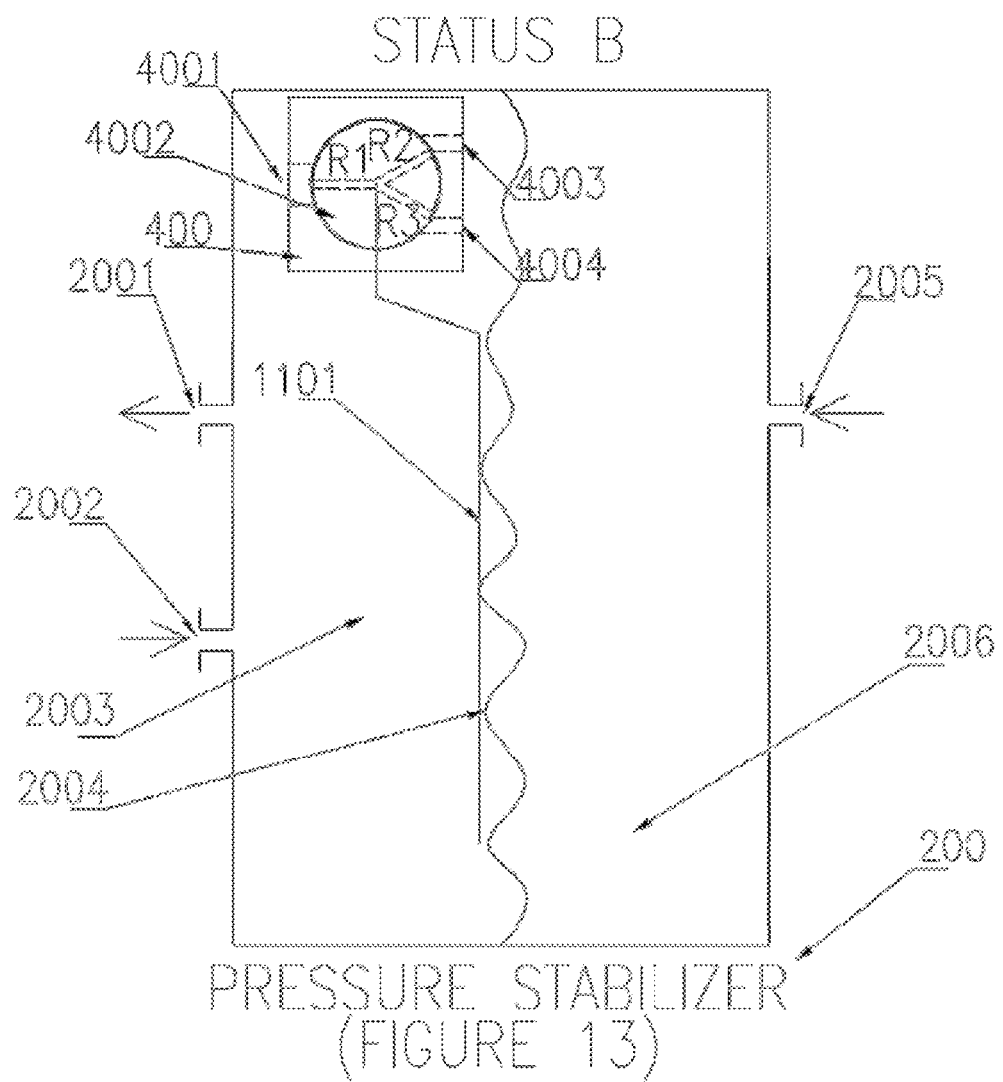

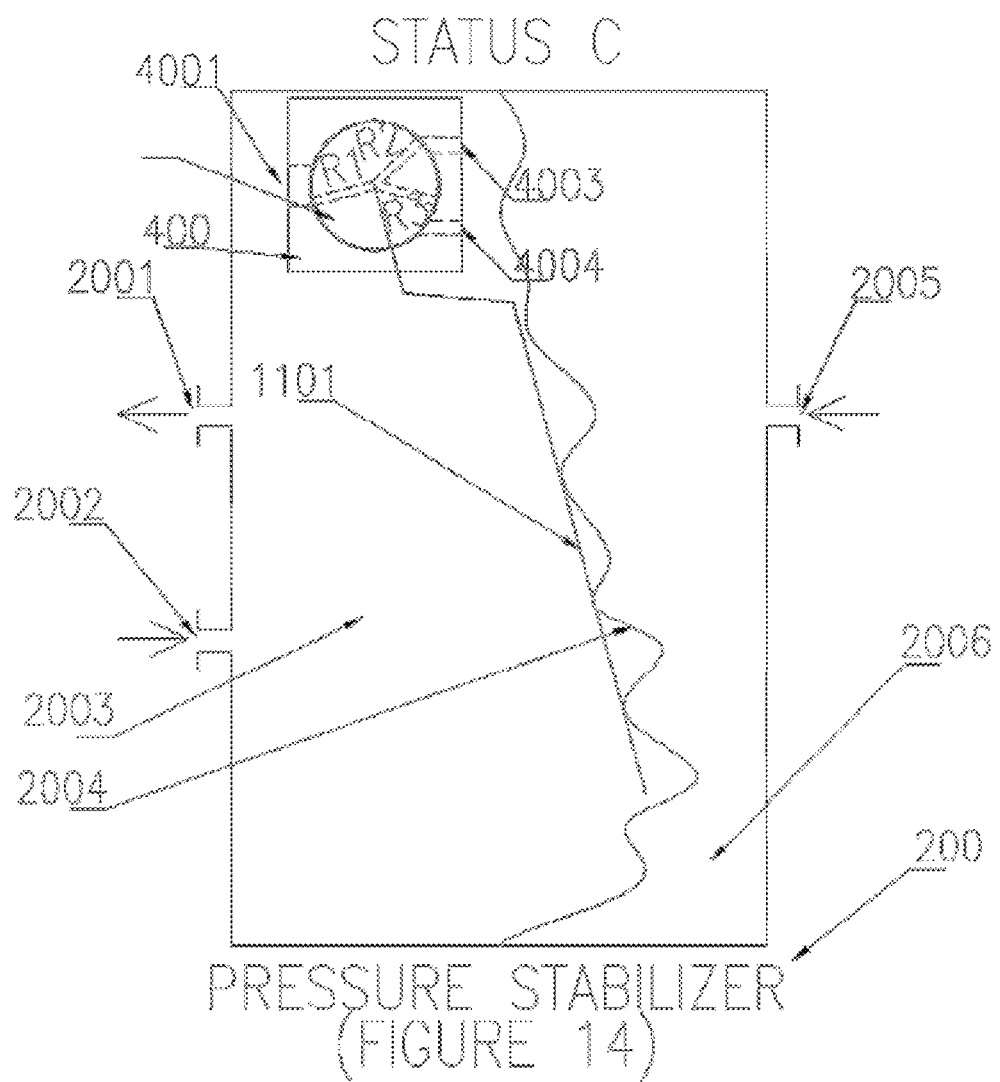

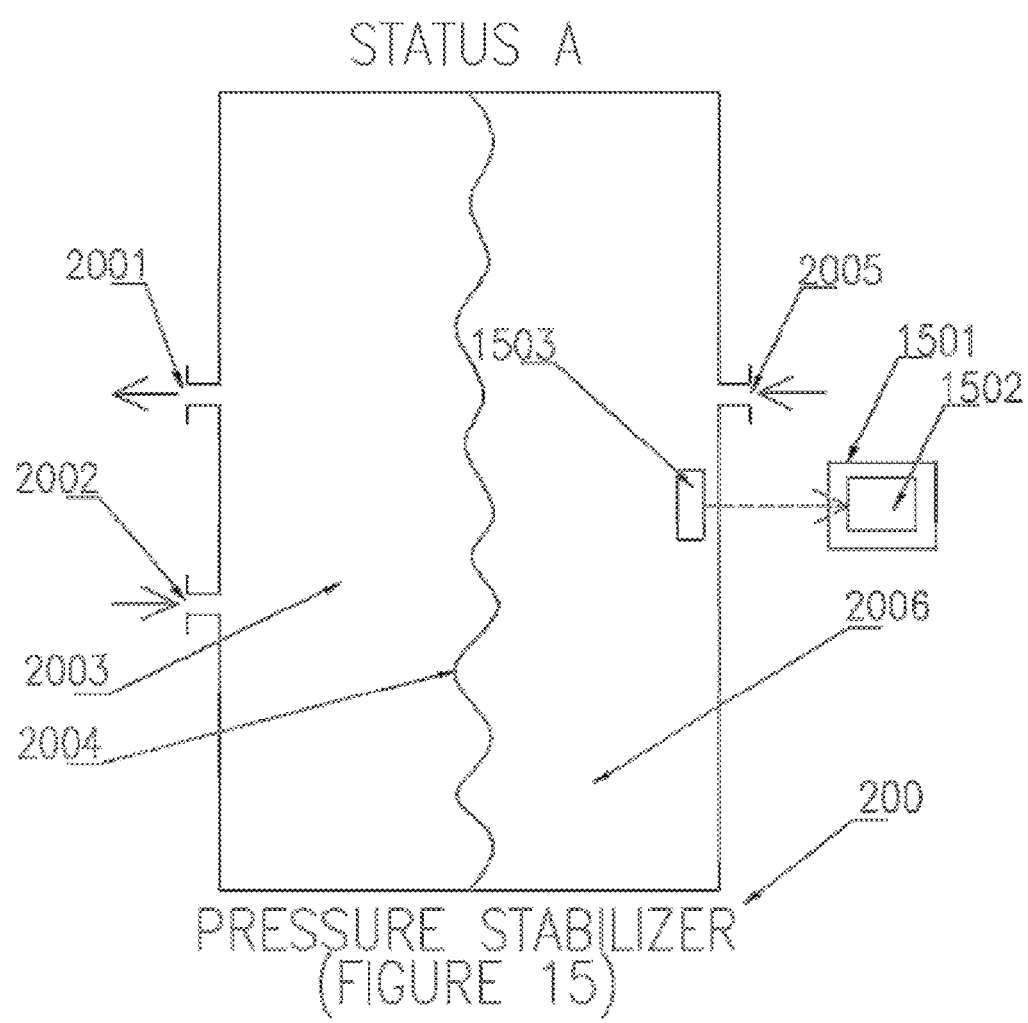

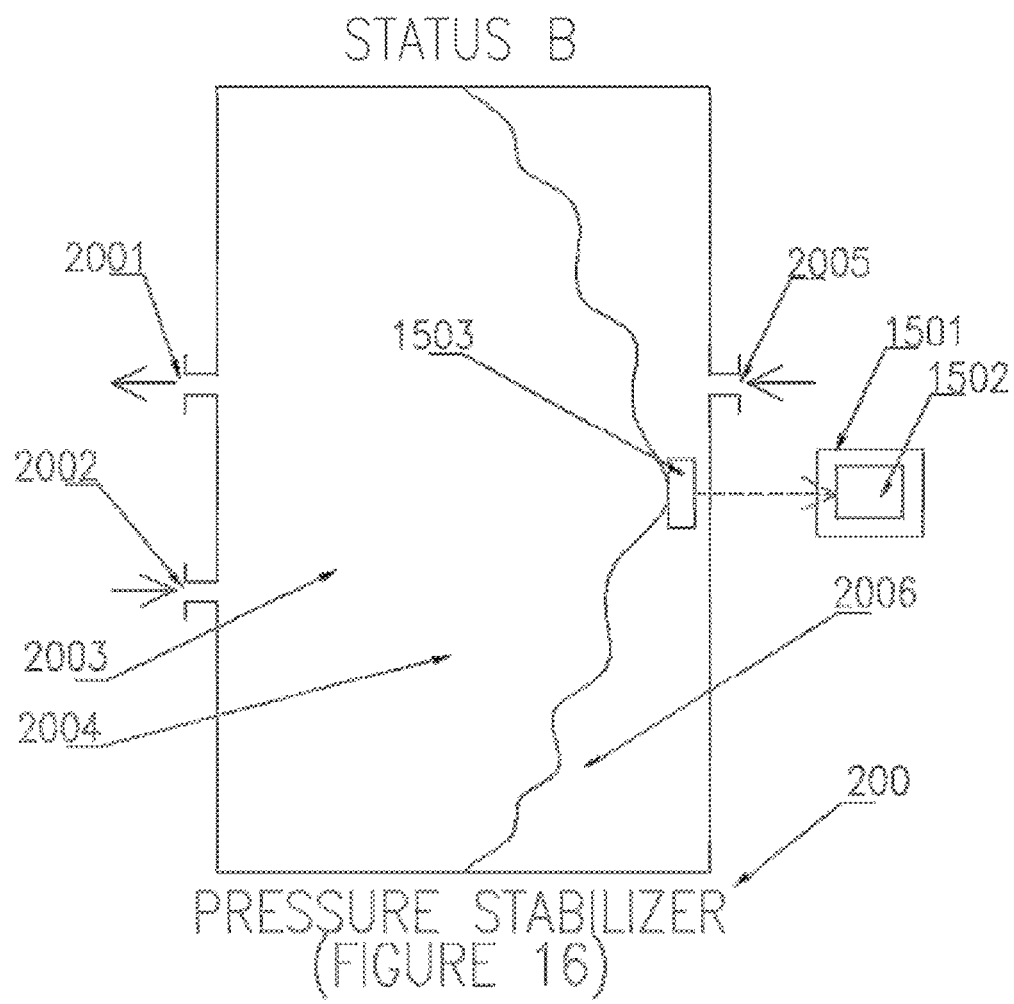

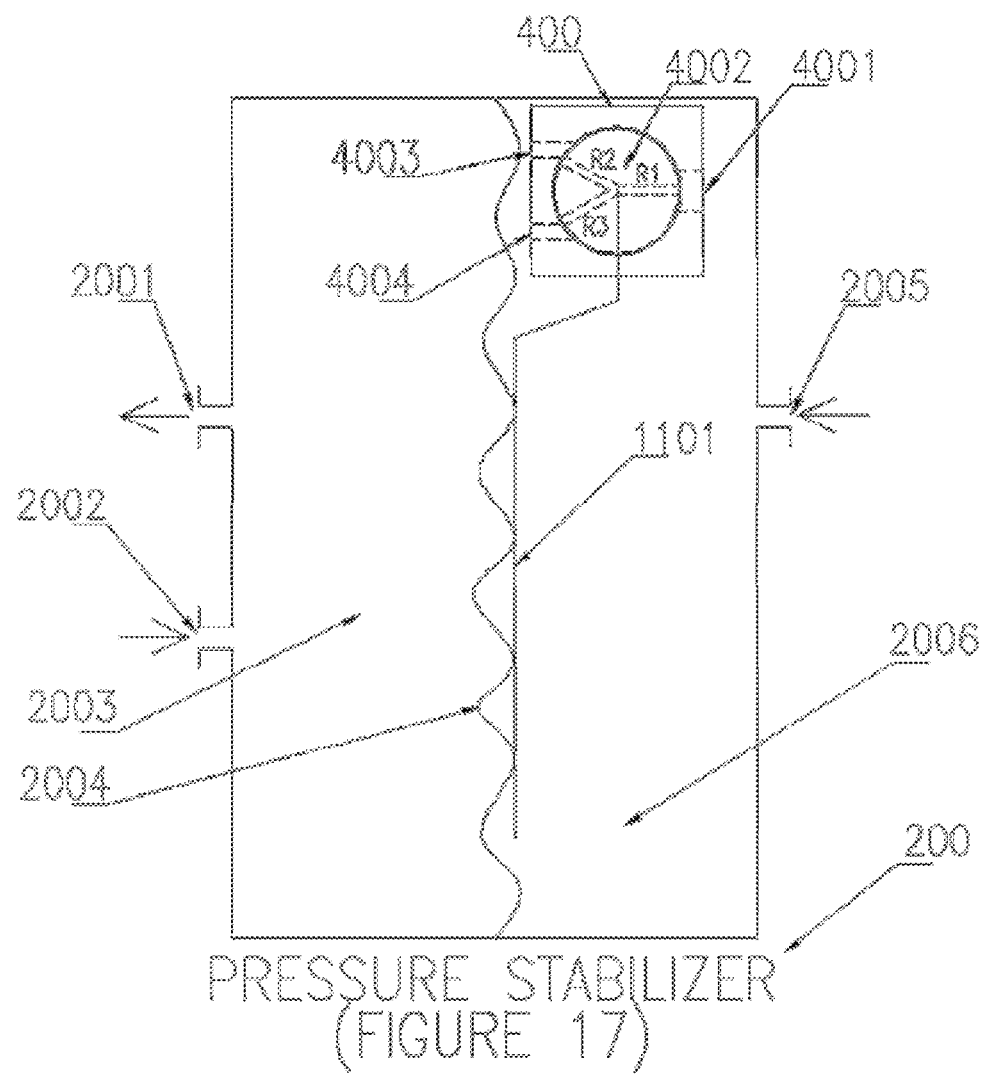
PRESSURE STABILIZER
(FIGURE 17)

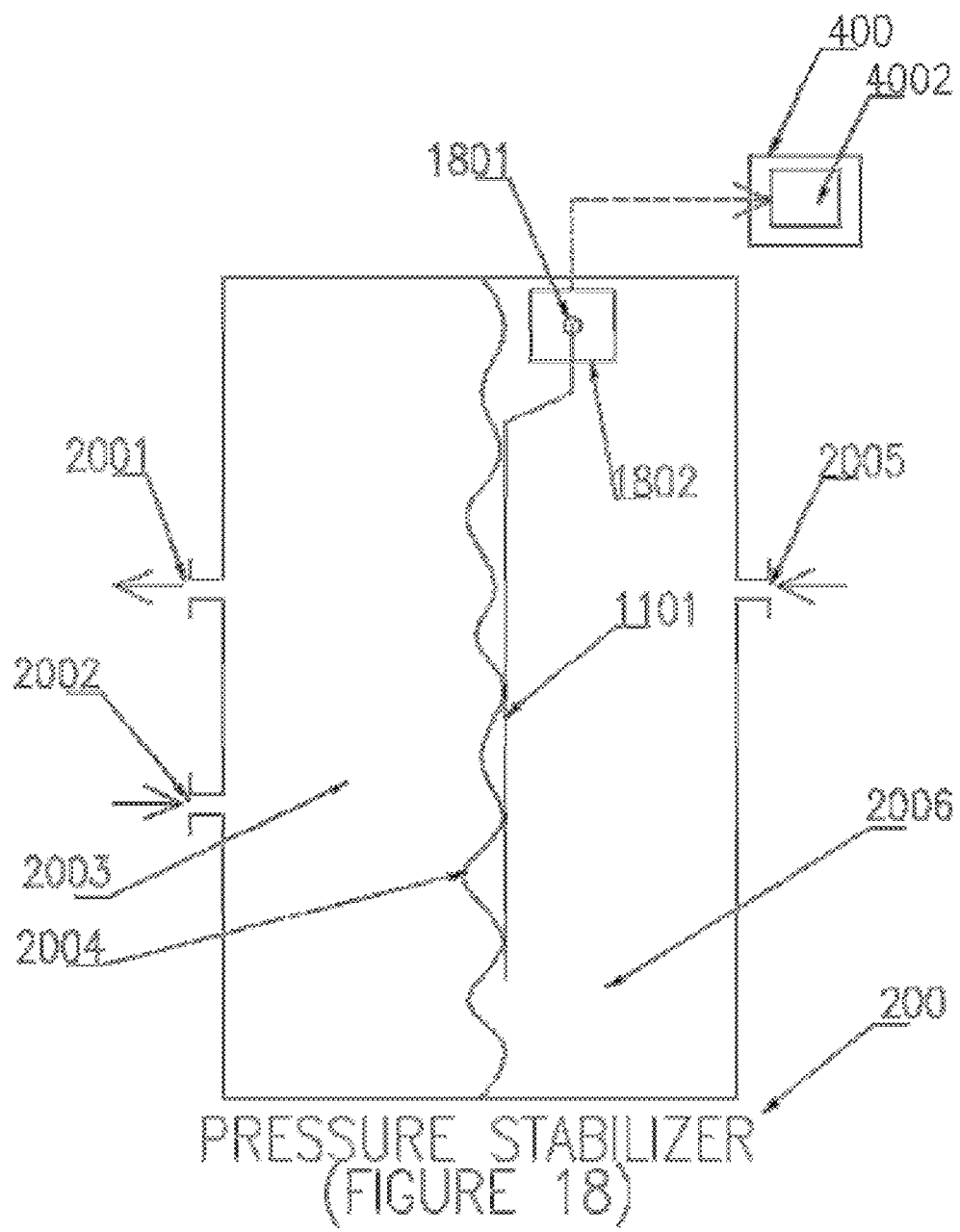

PROACTIVE PRESSURE STABILIZING SYSTEM AND METHOD

CROSS-REFERENCE TO RELATED APPLICATIONS

This application claims the benefit of the U.S. Provisional Patent application No. 61/925,218 entitled "PPS-Proactive Pressure Stabilizer", filed on Jan. 8, 2014, and US62030671 entitled "PPSS-Proactive Pressure Stabilizing System", filed on Jul. 30, 2014.

FIELD OF THE INVENTION

This invention relates to a system and method for stabilizing the pressure of a gas source as well as recycling the gas thereof to a downstream system.

BACKGROUND OF THE INVENTION

Pressure control is widely used in industrial processes or machineries. It affects the quality and productivity of production and is an important factor in triggering reaction in chemical production processes.

An On-line Analyzer paired with a Sample Conditioning System is commonly used for quality control in production lines of petrochemical, food, biotech, and drug industries. The Sample Conditioning System dictates the performance of the On-line Analyzer. It must ensure that the gas flowing into the On-line Analyzer is stable in pressure, temperature and flow.

Usually gas flowing into the On-line Analyzer from the Sample Conditioning System has environmental temperature and pressure. Gas discharged from the On-line Analyzer usually cannot flow back into the production pipeline by itself but rather needs to be pumped back to production or to a recycler. The layout is shown in FIG. 2. Explanations of FIG. 2:
a) 201: Gas source to be pressure-controlled.
b) 202: Sample Conditioning System: a processing system that works with, and is in front of, the On-line Analyzer.
c) 203: On-line Analyzer: an analyzer that takes gas inflow from the Sample Conditioning System and continuously analyzes it.
d) 204: Pump.
e) 101: High Pressure Recovery Tank: for recycling gas.

If the pressure of the recycling tank at the output end of the On-line Analyzer is not stable in pressure, it will cause the gas pressure inside the On-line Analyzer to be unstable. As a result, the reading of the On-line Analyzer will fluctuate abruptly. Therefore, system designers are forced to discharge the analyzed gas into the atmosphere as shown in FIG. 3. Explanation of FIG. 3:
a) 201: same with 201 in FIG. 2.
b) 202: same with 202 in FIG. 2.
c) 203: same with 203 in FIG. 2.
d) 301: Atmosphere.

Another technology in stabilizing gas pressure and recycling gas is shown in FIG. 7. Explanation of FIG. 7:
a) 701 Limit Switch A: a directionless switch for stopping the operation of gas pumping.
b) 702 Tripper Rod: a rigid rod which moves with the wire to a particular position to trigger a Limit Switch.
c) 703 Limit Switch B: a directionless switch for starting the operation of gas pumping.
d) 704 Counterweight: to balance the weight of the Floating Top via the Pulley Set.
e) 705 Pulley: to support the wires and make it easy for the wires to move and change the direction of the force applied.
f) 706 Pulley: same with 705.
g) 707 Floating Top: working together with the Pulley Set and the Counterweight such that when gas flows into the Bucket and raises the Floating Top, the accommodating volume of the Bucket increases without changing the pressure inside the Bucket.
h) 708 Bucket: for accommodating continuous gas inflow.
i) 201 Gas source: source of the gas which needs to be pressure-controlled.
j) 300 Booster Device: capable of drawing in gas from one end, pressurizing the gas, and discharging the gas from the other end.
k) 101: High-Pressure Recovery Tank.

The Bucket has a double-layered shell with high-density silicon oil filled in between the layers so that there is no space between the sides of Floating Top and the shell of the Bucket. The weight of the Floating Top is balanced by counterweights. When gas enters the Bucket, the Floating Top rises and the Tripper Rod declines. When the Tripper Rod touches the Limit Switch B, the Booster Device is started and the gas inside the Bucket is drawn out. Then the Floating Top goes down, causing the Tripper Rod to rise, until the Tripper Rod touches Limit Switch A and the Booster Device stops.

When gas flows into the Bucket, the inertia to raise the Floating Top must be overcome. Also, when the Booster Device is started by the Limit Switch B and ready to pump gas to the High Pressure Recovery Tank, there is the issue of the unstable pressure at the output end causing unstable suction volume. The Floating Top cannot swiftly move to balance the quick changes of gas flow due to its inertia of mass.

This design cannot satisfy the requirement of a stable On-line Analyzer when the pressure fluctuation is large in the recycler, or when the flow volume fluctuation is large at the source. Also, the components are exposed to the atmosphere all the time, the change of characteristics of the material on the surface would make the balance mechanism deteriorate.

SUMMARY OF THE INVENTION

The present invention provides a system and method for pressure stabilization of a gas source. It comprises a pressure stabilizer divided into a receiving chamber and a pressure chamber by a flexible membrane, a booster device, a gas divider, and a control driver that can sense movement of the flexible membrane and control the gas divider accordingly. A pressure pilot is used to set the desired pressure of the pressure chamber. The pressure of the receiving chamber will stabilize to be the same with that of the pressure chamber regardless of the gas flow or pressure change at the gas source or the pressure fluctuation in the downstream system. The gas passing the system can eventually be recycled without harming the environment.

BRIEF DESCRIPTION OF THE DRAWINGS

FIG. 1 illustrates the positive type layout and negative type layout of the PPSS.

FIG. 2 illustrates the layout of a typical On-Line Analyzer coupled with a Sample Conditioning System.

FIG. 3 illustrates a work-around for the unstable pressure of an On-Line Analyzer and Sample Conditioning System set by discharging gas into the atmosphere.

FIG. 4 illustrates how PPSS, the present invention, can be used to stabilize gas pressure in an On-Line Analyzer and Sample Conditioning System set.

FIG. 5 illustrates how PPSS, the present invention, can be used in a gasoline recovery system at a gas station to stabilize gasoline vapor pressure and recycle gasoline vapor.

FIG. 6 illustrates how PPSS, the present invention, can be used in a hydrogen-oxygen fuel cell.

FIG. 7 illustrates an earlier technology of stabilizing a gas source and recycling the gas, using a gas bucket with a floating top connected to counterweights via pulleys.

FIG. 8 illustrates an embodiment of the present invention in positive type layout and with a gas reflux loop.

FIG. 9 illustrates an embodiment of the Gas Divider of the present invention under the Positive Type layout, wherein the Gas Divider is placed inside the Receiving Chamber.

FIG. 10 illustrates an embodiment of the Gas Divider of the present invention under the Negative Type layout, wherein the Gas Divider is placed inside the Receiving Chamber.

FIG. 11 illustrates an embodiment of the Divider Controller of the present invention, implemented by a rotor which is connected to a rigid rod.

FIG. 12 illustrates the Gas Divider under the Status A, and the R1, R2, R3 passage alignments in the rotor with the gas inlet/outlet/reflux channels.

FIG. 13 illustrates the Gas Divider under the Status B, and the R1, R2, R3 passage alignments in the rotor with the gas inlet/outlet/reflux channels.

FIG. 14 illustrates the Gas Divider under the Status C, and the R1, R2, R3 passage alignments in the rotor with the gas inlet/outlet/reflux channels.

FIG. 15 illustrates an embodiment in which a Proximity Sensor is used to sense the movement of the Flexible Membrane while the Gas Divider and the Divider Controller are implemented electronically. The Flexible Membrane is positioned the middle of the Pressure Stabilizer.

FIG. 16 illustrates the same embodiment of FIG. 15 except that the Flexible Membrane has a movement to the right in the Pressure Stabilizer.

FIG. 17 illustrates an embodiment where the Gas Divider is placed inside the Pressure Chamber.

FIG. 18 illustrates an embodiment where the Gas Divider is placed outside the Pressure Stabilizer. A mechanical rod structure is used to connect with the Flexible Membrane and together they drive a Signal Transmitter that sends signals to the external Gas Divider.

DETAILED DESCRIPTION OF THE INVENTION

The present invention is a Proactive Pressure Stabilizing System ("PPSS") and the method thereof. It comprises a Pressure Stabilizer, a Booster Device, a Gas Divider, and a Control Driver.

The present invention can be laid out using one of the two ways shown in FIG. 1 to connect the aforementioned components. In the Positive Type layout, the outlet end of the Booster Device is connected to the Gas Divider. It's called Positive Type because the outlet end of the Booster Device has positive pressure. In the Negative Type layout, the inlet end of the Booster Device is connected to the Gas Divider. It's called Negative Type because the suction end of the Booster Device has negative pressure.

Explanations of FIG. 1:

a) 101 High Pressure Recovery Tank: for recycling pressurized gas.

b) 102 Control Driver: a mechanism that senses the movement or shape change of the Flexible Membrane and controls the Divider Controller of the Gas Divider accordingly. It can be implemented using either a mechanical structure, like a rigid rod, or an electronic signal transmission.

c) 200 Pressure Stabilizer: divided into a Receiving Chamber and a Pressure Chamber by the Flexible Membrane.

d) 2001 Receiving Chamber Gas Outlet.

e) 2002 Receiving Chamber Source Inlet: for channeling the gas source into the Receiving Chamber.

f) 2003 Receiving Chamber: for accepting continuous gas inflow.

g) 2004 Flexible Membrane: a piece of flexible material that can sense and balance the pressure from both contacting sides.

h) 2005 Pressure Pilot: for channeling in a particular pressure to the Pressure Chamber.

i) 2006 Pressure Chamber: for accepting gas of a particular pressure which must remain constant when the volume of the Pressure Chamber changes.

j) 300 Booster Device: a pump; drawing in gas from one side and discharging the gas from the other side after pressurizing the gas.

k) 3001 Booster Inlet: inlet end of the Booster Device.

l) 3002 Booster Outlet: outlet end of the Booster Device.

m) 400 Gas Divider: for controlling and adjusting, using its Divider Controller, the portion of gas outflow or the amount of gas being drawn out.

n) 4001 Divider Gas Inlet: gas inlet of the Gas Divider.

o) 4002 Divider Controller: an adjustment mechanism for the gas flow, using either a mechanic apparatus, for example, a rotor, or an electronic control to adjust the amount or portion of the gas flowing out or being drawn out from the Gas Divider.

p) 4003 Divider Gas Outlet: gas outlet of the Gas Divider.

A Flexible Membrane divides the inside of the Pressure Stabilizer into two independent chambers: the Receiving Chamber and the Pressure Chamber. The Receiving Chamber continuously accepts gas inflow. Via the natural extension or shape change of the Flexible Membrane, the pressure in the Receiving Chamber is kept the same with the particular pressure fed to the Pressure Chamber. The best material for the Flexible Membrane should be light, thin, soft, or creased. If creased, the extension of the Flexible Membrane is actually crease-unfolding, rather than extending the material to induce an opposite tension which would be exerted on the Receiving Chamber and would change the pressure of the Receiving Chamber. Light, thin and soft material can also reduce the delay effect caused by inertial mass and allow the Flexible Membrane to extend, move left/right or up/down without overcoming the extra force needed by inertial mass that would change the inner pressure of the Receiving Chamber. The material must be suitable for the characteristics of the gas inflow. If possible, it should be inactive to the gas inflow. For example, Teflon, PP, metal foil, PU, Viton, PE, Carbon, Ryton, Silicon can be used.

Overall, the Booster Device adds pressure to the gas so that it can flow to the downstream system, usually a High Pressure Recovery Tank in practice, unless the downstream system has a pump-like function and is negative in pressure relative to the Receiving Chamber. Devices like Booster Pump, Bellow Pump, Diaphragm Pump, Ejector (Aspirator, Eductor), Gear Pump, and Compressor can be candidates for the Booster Device. In fact, any form of pumping device available in the market will do, as long as their physical property and the material are suitable for the application. Because the pump volume of the Booster Device will decrease as the pressure of the downstream increases, the principle of choosing the Booster Device is that, under the maximum possible downstream pressure, the pump volume of the Booster Device has to be greater than the maximum possible gas inflow at the Receiving Chamber.

The Gas Divider has a gas inlet, a gas outlet and a Divider Controller that adjusts the gas flowing out or being drawn out of the Gas Divider. The Divider Controller is driven by the Control Driver which can sense the movement or shape-change of the Flexible Membrane. Either or both of the Divider Controller and the Control Driver can be implemented mechanically or electronically. Various implementations will be discussed later.

No matter how the flow or pressure of the gas flowing into the Receiving Chamber fluctuates, or how the pressure in the downstream system changes, the pressure of the Receiving Chamber will converge to be the same as that of the Pressure Chamber. The mass flow of the gas being pumped to the downstream system, High Pressure Recovery Tank for an example, after being automatically adjusted by the Divider Controller, will be "synchronized in change" with the mass flow of the gas flowing into the Receiving Chamber. Here, "synchronized in change" means that when the mass flow of the gas inflow changes, the mass flow being drawn out will, because of the extension or movement of the Flexible Membrane, change the pressurized flow into the High Pressure Recovery Tank until its mass flow is equivalent to the mass flow of the gas inflow. The time needed for the "synchronization" depends on the volume of the Pressure Stabilizer and the degree the mass flow of the gas inflow fluctuates.

With the Positive Type layout shown in FIG. 1, the Booster Device connects its inlet to the outlet of the Receiving Chamber to draw gas; and its outlet to the inlet of the Gas Divider. The Divider Controller controls the amount of gas flowing out of the Gas Divider using the adjustment mechanism initially produced by the extension of the Flexible Membrane and conveyed by the Control Driver, so that the mass flow coming out of the whole system is the same as the mass flow going into the system. If the mass flow of incoming gas is equal to that of outgoing gas, the amount of incoming gas molecules would be the same with the amount of outgoing gas molecules and the Flexible Membrane would not further extend or change shape. This is the reason of the synchronization of mass flow.

In the Positive Type layout, if the Divider Gas Outlet is fully closed by the Divider Controller, some booster devices, by their design, could be overheated or their moving components could be latched and damaged because of the lack of gas exhaust. This can be solved by adding a reflux opening to the Gas Divider and redirect the gas back to the Receiving Chamber. If no such concern exists for the booster device used, reflux is not needed. The connections are shown in FIG. 8. Explanation of FIG. 8:
a) 101 same with 101 in FIG. 1.
b) 200 same with 200 in FIG. 1.
c) 2001 same with 2001 in FIG. 1.
d) 2002 same with 2002 in FIG. 1.
e) 2003 same with 2003 in FIG. 1.
f) 2004 same with 2004 in FIG. 1.
g) 2005 same with 2005 in FIG. 1.
h) 2006 same with 2006 in FIG. 1.
i) 2007 Receiving Chamber Reflux Inlet: for receiving the gas reflux.
j) 300 same with 300 in FIG. 1.
k) 3001 same with 3001 in FIG. 1.
l) 3002 same with 3002 in FIG. 1.
m) 400 same with 400 in FIG. 1.
n) 4001 same with 4001 in FIG. 1.
o) 4002 same with 4002 in FIG. 1.
p) 4003 same with 4003 in FIG. 1.
q) 4004 Gas Reflux: an outlet for channeling gas in the Gas Divider back to the Pressure Stabilizer.

In FIG. 8, the reflux loop ensures that when the Divider Controller blocks gas from leaving the Gas Divider, the gas can still be channeled back to the Receiving Chamber so that the outflow of the Booster Device is not interrupted. It helps to release the pressure of the Booster Device and dissipate heat accumulated in the Booster Device.

In the Positive Type layout, because the pressure at the output end of the Booster Device is higher, the Divider Gas Outlet and the Gas Reflux need to overcome a greater resistance due to higher pressure when opening from the completely-closed state. If a mechanical Control Driver, for example, a rod, is used, the rod would need to be long enough to have enough total torque to drive the Divider Controller. To prevent leaking of pressurized gas, the gap inside the Divider Controller for moving or rotating needs to be reduced. However, too small or too tight of a gap would not produce enough rotation torque and make it necessary for the Flexible Membrane to be paired with a longer rod so that the torque pushing the Divider Controller can be amplified and the precision of pressure control can be raised. If electronic adjustment signal is used in the Control Driver/Divider Controller set, the above consideration is not necessary.

With the Negative Type layout, because the inlet end of the Booster Device is lower in pressure than the outlet end, the aforementioned flow resistance needed to overcome is relatively smaller. The leaking issue can be solved more easily, and the stability and precision of pressure control is easier to increase. Likewise, using electronic adjustment signal for control would void this consideration.

FIG. 11 is an example of using mechanical transmission in the implementation of the Divider Controller. Explanation of FIG. 11:
a) 400: same with 400 in FIG. 1.
b) 4001: same with 4001 in FIG. 1.
c) 4002: Rotor, as an example of the Divider Controller. It has three connected channels: R1, R2 and R3 as shown. R1 is for gas inflow, R2 is for gas outflow, and R3 is for gas reflux.
d) 4003: same with 4003 in FIG. 1.
e) 4004: same with 4004 in FIG. 8.
f) 1101 Rod, as an example of the Control Driver. It's connected to the Flexible Membrane, moves and rotates the Rotor 4002 tracking the Flexible Membrane's extension or shape change.

FIG. 11 shows three statuses of the Rotor's angle driven by the Rod, and the transition among the statuses. The following explains these three statuses and the gas passages under each status:
a) Status A: Divider Gas Inlet and R1 are completely pass-through, Divider Gas Outlet and R2 are completely closed, and Gas Reflux and R3 are completely pass-through. Therefore Divider Gas Inlet and Gas Reflux are completely pass-through.
b) Status B: Divider Gas Inlet and R1 are completely pass-through, Divider Gas Outlet and R2 are partially pass-through, and Gas Reflux and R3 are partially pass-through.

Therefore Divider Gas Inlet is partially pass-through at the same time with Divider Gas Outlet and Gas Reflux.

c) Status C: Divider Gas Inlet and R1 are completely pass-through, Divider Gas Outlet and R2 are completely pass-through, and Gas Reflux and R3 are completely closed. Therefore Divider Gas Inlet and Divider Gas Outlet are completely pass-through.

The above example uses basic lever mechanism and let the rod attached to the Rotor follow the extension and shape change of the Flexible Membrane to achieve the torque needed for rotation. It won't exert force on the Flexible Membrane significantly, and won't cause pressure difference between the Receiving Chamber and the Pressure Chamber.

FIG. 9 shows one mechanical implementation of the Gas Divider under the Positive Type where the Gas Divider is placed inside the Receiving Chamber. Explanation of FIG. 9:
a) 901 Rear Plate.
b) 902 Gas Reflux: for channeling gas back to the Receiving Chamber.
c) 903 Gas Divider.
d) 904 Divider Gas Outlet.
e) 905 Divider Gas Inlet.
f) 906 Right Plate
g) 907 R2 Exit: gas from Divider Gas Inlet flows to the R2 channel via the R1 channel and then flows to the Divider Gas Outlet using this exit.
h) 908 R3 Exit: gas from the Divider Gas Inlet flows to the R3 channel via the R1 channel and then flows to Gas Reflux using this exit.
i) 909 Divider Controller implemented by a Rotor.
j) 901 Front Plate.
k) 911 Control Driver implemented by a Rod.

FIG. 10 shows one mechanical implementation of the Gas Divider under the Negative Type Layout where a Rotor is used for the Divider Controller and the Gas Divider is placed inside the Receiving Chamber. Explanation of FIG. 10:
a) 1001 Rotor Seat: for affixing the Rotor.
b) 1002 Bearing: a component helping the Rotor rotates.
c) 1003 Divider Controller implemented with a Rotor.
d) 1004 Divider Gas Inlet.
e) 1005 Gas Divider Body.
f) 1006 Body Seat of the Gas Divider: for installing and seating the body of the Gas Divider.
g) 1007 Divider Gas Outlet.
h) 1008 Rod Socket: a socket for installing the Rod.

FIG. 12 shows the relative positions of the components in Status A depicted in FIG. 11 when the Gas Divider is installed inside the Receiving Chamber. Explanation of FIG. 12:
a) 200: same with 200 in FIG. 1.
b) 2001: same with 2001 in FIG. 1.
c) 2002: same with 2002 in FIG. 1.
d) 2003: same with 2003 in FIG. 1.
e) 2004: same with 2004 in FIG. 1.
f) 2005: same with 2005 in FIG. 1.
g) 2006: same with 2006 in FIG. 1.
h) 2007: same with 2007 in FIG. 8.
i) 400: same with 400 in FIG. 1.
j) 4001: same with 4001 in FIG. 1.
k) 4002: same with 4002 in FIG. 1.
l) 4003: same with 4003 in FIG. 1.
m) 4004: same with 4004 in FIG. 8.
n) 1101: same with 1101 in FIG. 11.

In FIG. 12, the amount of gas flowing into the Pressure Stabilizer continues to be less than the gas flowing out of it. The Flexible Membrane reflects the volume decrease of the Receiving Chamber. The Rod rotates the Rotor, tracking the position change of the Flexible Membrane. The rotation angle of the Rotor makes the Divider Gas Outlet completely closed and stops the gas from flowing out of the Pressure Stabilizer. Gas Reflux is completely pass-through, accelerating the gas flow-back.

FIG. 13 shows the relative positions of the components in Status B depicted in FIG. 11 when the Gas Divider is installed inside the Receiving Chamber. Explanation of FIG. 13:
a) 200: same with 200 in FIG. 1.
b) 2001: same with 2001 in FIG. 1.
c) 2002: same with 2002 in FIG. 1.
d) 2003: same with 2003 in FIG. 1.
e) 2004: same with 2004 in FIG. 1.
f) 2005: same with 2005 in FIG. 1.
g) 2006: same with 2006 in FIG. 1.
h) 2007: same with 2007 in FIG. 8.
i) 400: same with 400 in FIG. 1.
j) 4001: same with 4001 in FIG. 1.
k) 4002: same with 4002 in FIG. 1.
l) 4003: same with 4003 in FIG. 1.
m) 4004: same with 4004 in FIG. 8.
n) 1101: same with 1101 in FIG. 11.

In FIG. 13, the Flexible Membrane is positioned at the best state in the middle where it has the largest room of extension to the right and to the left. The angle of the Rotor makes the passage between R2 and the Divider Gas Outlet and the passage between R3 and the Gas Reflux both partial pass-throughs. The Divider Gas Inlet connects to R2 via R1 and then to the Divider Gas Outlet. It also connects to the Gas Reflux via connecting to R3. At this point, the gas flowing in from the Divider Gas Inlet partially goes to the Divider Gas Outlet and partially goes to the Gas Reflux.

FIG. 14 shows the relative positions of the components in Status C depicted in FIG. 11 where the Gas Divider is installed inside the Receiving Chamber. Explanation of FIG. 14:
a) 200: same with 200 in FIG. 1.
b) 2001: same with 2001 in FIG. 1.
c) 2002: same with 2002 in FIG. 1.
d) 2003: same with 2003 in FIG. 1.
e) 2004: same with 2004 in FIG. 1.
f) 2005: same with 2005 in FIG. 1.
g) 2006: same with 2006 in FIG. 1.
h) 400: same with 400 in FIG. 1.
i) 4001: same with 4001 in FIG. 1.
j) 4002: same with 4002 in FIG. 1.
k) 4003: same with 4003 in FIG. 1.
l) 4004: same with 4004 in FIG. 8.
m) 1101: same with 1101 in FIG. 11.

In FIG. 14, the amount of gas flowing into the Pressure Stabilizer continues to be higher than the gas flowing out of it. The Flexible Membrane reflects the Receiving Chamber volume increase. The Rod turns the Rotor tracking the position change of the Flexible Membrane. The rotation angle of the Rotor makes the Divider Gas Outlet a complete pass-through, accelerating the gas exhaust of the Pressure Stabilizer. The Gas Reflux is completely closed, blocking the gas reflux passage.

FIG. 15 and FIG. 16 illustrate the implementation using a Proportional Control or a Digital On-Off Control and replacing the mechanical Rod with a proximity sensor. For example, a proximity sensor using Eddy Current can detect the distance of the Flexible Membrane and send a signal to the Divider Controller. The Divider Controller in turn controls the passage connections of the Divider Gas Inlet, the Divider Gas Outlet and the Gas Reflux. Multiple sets of optical-based proximity sensor can also be used to sense the position change of the Flexible Membrane among all the points in between Status A and Status B and send various proportional control signals to the Divider Controller reflecting the position, so that the gas flow at each passage connection point can be controlled.

Explanation of FIGS. 15 and 16:
a) 200: same with 200 in FIG. 1.
b) 2001: same with 2001 in FIG. 1.
c) 2002: same with 2002 in FIG. 1.
d) 2003: same with 2003 in FIG. 1.
e) 2004: same with 2004 in FIG. 1.
f) 2005: same with 2005 in FIG. 1.
g) 2006: same with 2006 in FIG. 1.
h) 1501: an electronic Gas Divider.
i) 1502: an electronic Divider Controller.
j) 1503: Proximity Sensor: a non-contacting sensor that can sense the distance of objects and output a signal of corresponding strength.

The force needed for the movement of the Divider Controller cannot be exerted on the Flexible Membrane to trigger the inner pressure change of the Receiving Chamber. In the above-discussed Rod and Rotor example, the Divider Controller needs to have a very smooth contacting surface for the rotation or movement, and the gap in between needs to be small enough not to cause any leak during operation. It's advantageous that the Rod has as many contacting points as possible with the surface of the Flexible Membrane. The more the contacting points, the larger the sum of torque induced. In order to let the Rod maintain the contacting points when the Flexible Membrane extends or changes shape, a belt loop-like structure can be used across the surface of the Flexible Membrane so that the Rod can go through the loops and move freely on the surface of the Flexible Membrane. Alternatively the Rod can be adhered to the surface of the Flexible Membrane. When the Flexible Membrane changes shape, it conveys the amount of shape change to the rod. The torque produced by the summation of the minor force at each close-contact point between the Rod and the Flexible Membrane pushes the Rod and turns the Rotor. The longer the Rod is, the larger the torque is. The larger the area of the Flexible Membrane is, the larger the allowed extension can be, and in turn, the greater the instant volume change can be tolerated.

FIG. 17 illustrates an example of a Gas Divider installed inside the Pressure Chamber. It has the same control mechanism with those that have the Gas Divider installed inside the Receiving Chamber. Explanation of FIG. 17:
a) 200: same with 200 in FIG. 1.
b) 2001: same with 2001 in FIG. 1.
c) 2002: same with 2002 in FIG. 1.
d) 2003: same with 2003 in FIG. 1.
e) 2004: same with 2004 in FIG. 1.
f) 2005: same with 2005 in FIG. 1.
g) 2006: same with 2006 in FIG. 1.
h) 400: same with 400 in FIG. 1.
i) 4001: same with 4001 in FIG. 1.
j) 4002: same with 4002 in FIG. 1.
k) 4003: same with 4003 in FIG. 1.
l) 4004: same with 4004 in FIG. 8.
m) 1101: same with 1101 in FIG. 11.

FIG. 18 is another implementation with the Gas Divider placed outside of the Pressure Stabilizer. The Rod moves along with the Flexible Membrane and drives a signal transmitter which transmits a signal to the Divider Controller in the external Gas Divider, according to the rotating position of the Rod. Explanation of FIG. 18:
a) 200: same with 200 in FIG. 1.
b) 2001: same with 2001 in FIG. 1.
c) 2002: same with 2002 in FIG. 1.
d) 2003: same with 2003 in FIG. 1.
e) 2004: same with 2004 in FIG. 1.
f) 2005: same with 2005 in FIG. 1.
g) 2006: same with 2006 in FIG. 1.
h) 400: same with 400 in FIG. 1.
i) 4002: same with 4002 in FIG. 1.
j) 1101: same with 1101 in FIG. 11.
k) 1801 Divider Controller implemented by a Rotor: the rotation of the Rotor triggers a corresponding signal.
l) 1802 Signal Transmitter: transmits signal reflecting the position of the Rotor.

In the case where a Rod is used for the Control Driver, to increase the precision of pressure control, and to better sense the pressure difference between the Receiving Chamber and the Pressure Chamber, we can extend the length of the Rod to increase the pressure control sensitivity. If implemented electronically, we can raise the sensitivity of the component that senses the position of the Flexible Membrane, or use an optical sensor of higher resolution. Moreover, we can enlarge the ratio of the Receiving Chamber volume over the gas inflowing rate. The larger the volume of the Pressure Stabilizer is, the lower the ratio of the inflow gas molecules relative to the Pressure Stabilizer volume is, and the smaller the pressure change is. That is, the larger the Pressure Stabilizer volume, the larger the tolerable bursts of flow rate change. Enlarging the volume of the Pressure Stabilizer usually also means enlarging the area of the Flexible Membrane and its allowed degree of extension, and the Pressure Stabilizer's higher toleration of instant inflow rate change.

The present invention can be used to solve the problems of the aforementioned On-Line Analyzer/Sample Conditioning System example. It can steadily and precisely control the pressure of the Receiving Chamber so that it approximates the particular pressure of the Pressure Chamber. By changing the volume of the Pressure Stabilizer, or by changing the sensibility of the component or mechanical structure that detects the Flexible Membrane extension, the precision can be adjusted to comply with application needs. The present invention can also recycle the gas back to the production pipeline or a recycling tank without exhausting it into the atmosphere. The layout is shown in FIG. 4. Explanation of FIG. 4:
a) 201: same with 201 in FIG. 2.
b) 202: same with 202 in FIG. 2.
c) 203: same with 203 in FIG. 2.
d) 401: PPSS, the present invention.
e) 101: High Pressure Recovery Tank.

The present invention can bear the condition of an unstable gas flow or gas pressure in the upstream and unstable pressure of a High Pressure Recovery Tank in the downstream, and still keep the pressure inside the Receiving Chamber stable. It functions as the exhaust and recycler of the On-line Analyzer, and allows the On-line Analyzer to always maintain a stable analyzing condition to achieve the performance The gas vapor recycling system at gas stations is another area the present invention can be used. The Gas Vapor Hood on the nozzle needs to have a suction volume larger than the escaping gasoline vapor to avoid leaking of gasoline vapor. When gasoline vapor is being vacuumed in, the surrounding air is also drawn in at the same time, causing the opening of the Gas Vapor Hood to have slightly negative pressure. The issues introduced in view of processing and consumer rights are:

a) The recycled gasoline vapor contains oxygen and becomes dangerously explosive.
b) The recycled gasoline vapor contains large amount of air and makes recycling not economical.
c) The suction end of Gas Vapor Hood shows slightly negative pressure, which in turn causes more gasoline to evaporate. This additional evaporated gasoline in turn is carried away by the Gas Vapor Hood. This phenomenon will continue until the gas pumping is stopped. It affects consumer's right directly.

To solve the problem, first we should know that the gasoline vapor introduced when pumping gas into a car comes from the following sources:

a) Gasoline vapor at the environmental temperature of the gas tank. Gasoline vapor pressure is a function of temperature. The environmental temperature determines the vapor pressure.
b) Gasoline vapor caused by drastic disturbance: Gasoline is energized by the pump and bursts out of the nozzle. It is formed because velocity, collision and drastic disturbance cause those gasoline molecules with high energy to escape the surface of the liquid.
c) Pushed-out gasoline vapor: adding gasoline causes the liquid level of the tank to rise and pushes gasoline vapor on the top out of the tank.

The b) and c) factors above cause mass quantity of gasoline vapor escaping the opening of the gas tank and affect the surrounding environment. The present invention can be applied to this situation as FIG. 5 shows. The explanation of FIG. 5:

a) 501: Automotive fuel tank.
b) 502: Gas nozzle.
c) 503: Gas Vapor Hood: a vacuuming hood surrounding the gas nozzle. When the nozzle reaches inside the automotive fuel tank, the Gas Vapor Hood will encompass the whole opening of the tank.
d) 401 PPSS: the present invention.
e) 505 Gas Recovery Device: collects recycled gasoline vapor and separates it into liquid gasoline and air.
f) 506 Gas Tank: the underground tank at the gas station.

In this application, we can fill the Pressure Chamber with small amount of gasoline that can exist in both liquid and vapor, and seal the Pressure Pilot opening. Alternatively we can connect Pressure Pilot to a pressure source with the above property so that the pressure in the Pressure Chamber is always the same with the gasoline vapor pressure of the gas tank at the environmental temperature. Before pumping gasoline, the pressure at the gasoline filling point doesn't form a pressure difference with the Receiving Chamber to push gas vapor into the Receiving Chamber. At this point, the Receiving Chamber has zero vapor inflow. The vacuumed-out vapor for recycling is also zero.

After gasoline pumping starts, the additional "gasoline vapor caused by drastic disturbance" and the "pushed-out gasoline vapor" form a pressure that causes the pressure at the gas tank opening to be greater than that in the Receiving Chamber so that gasoline vapor flows towards the Receiving Chamber, and eventually, after being pressurized by the Booster Device, flows to a gas recovery device. The Gas Vapor Hood is designed to encompass the gas tank opening completely, and is connected to the present invention. The layout shown in FIG. 5 will not draw in gasoline vapor at the environmental temperature, nor will it bring in additional air from the surroundings. Using PPSS, the present invention, in combination with a gasoline vapor recycling system can reduce the amount of vapor being vacuumed in, reduce the power consumption of cooling devices, recycle gasoline vapor of higher purity, reduce the escaped gasoline vapor, and raise the throughput.

Another application of the present invention is the gas supplying system of fuel cells. FIG. 6 is a reference of the gas supply system of a fuel cell. Explanation of FIG. 6:

a) 601 Hydrogen Gas.
b) 602 Oxygen Gas.
c) 603 Fuel Cell, which uses hydrogen and oxygen at its two electrodes and their electro-chemical reaction for electricity generation.
d) 401 PPSS, the present invention.
e) 604 Gas/Water Separator: a device that separates gas and water.

Fuel cells generate a large amount of heat when generating electricity. The pressure of gas supply at electrodes (proportional to gas reaction density at the electrodes) must be adjusted with the temperature change of the fuel cell so that the fuel cell can achieve the maximum and the most stable performance under continuous temperature change.

Gases that are not fully reacted are discharged. The present invention can collect gas discharged by fuel cells. PPSS causes the gas discharge outlets on both electrodes and the inside of the fuel cell to form a closed system with constant pressure difference, and in turn, precisely and stably controls the reaction pressure of gas supply on both electrodes. The collected gas can be reused after being pressurized and recycled, so that the gas utilization rate can be increased. This raises the throughput of the fuel cells.

PPSS can be widely used in all kinds of devices or applications that need precise pressure control. PPSS can also do without the high-tech precision electronic controls and simply take advantage of material properties and light mechanical structure to precisely control pressure without consuming power. It also can synchronize the mass flow of the discharged gas with the mass flow of the incoming gas. This is a breakthrough in industrial design and can be used in environment protection related applications nowadays when green power is a global concern.

In practice, in order for the user to see the operations of the PPSS, a measurer or sensor of flow, pressure, temperature or any physical or chemical property can be installed in the pipeline where the gas flows into the Pressure Stabilizer, where the gas is drown out of the Pressure Stabilizer, where the gas flows back to Pressure Stabilizer, or where the gas is pumped to High Pressure Recovery Tank. These added components has no effect on pressure stabilization, however they can help the user to view the operational states, and they are also a friendly design of the operation interface.

I claim:

1. A Proactive Pressure Stabilizing System (PPSS) for stabilizing a gas source and recycling gas thereof to a downstream system, said PPSS comprising:
   (a) a pressure stabilizer comprising a flexible membrane that divides the enclosure of said pressure stabilizer into a receiving chamber and a pressure chamber, wherein said receiving chamber having a source inlet for receiving gas from said gas source, a gas outlet, and a closable reflux inlet, said pressure chamber having a pressure pilot from which a particular fixed pressure is channeled in to make said pressure chamber stable at said fixed pressure, and said flexible membrane is capable of being driven by the pressure difference between said receiving chamber and said pressure chamber to have a movement or shape-change towards the direction of lower pressure;

(b) a booster device having a booster inlet and a booster outlet, and comprising means for pressurizing gas drawn in from said booster inlet and discharging gas from said booster outlet;

(c) a gas divider having a divider gas inlet, a first divider gas outlet, a second divider gas outlet and further comprising a divider controller means for dividing and channeling any portion, including zero, of gas entered from said divider gas inlet to the first divider gas outlet and the rest to the second divider gas outlet according to a propelling instruction; and (d) a control driver comprising means for sensing the movement or shape-change of said flexible membrane and accordingly providing said divider controller with said propelling instruction;

wherein said pressure stabilizer, said booster device and said gas divider are inter-connected in either one of the following ways:

(i) said pressure stabilizer connecting its gas outlet to the booster inlet of said booster device, said booster device connecting its booster outlet to the divider gas inlet of said gas divider, and said gas divider connecting its first divider gas outlet to said downstream system and its second divider gas outlet to the reflux inlet of said pressure stabilizer;

(ii) said pressure stabilizer connecting its said gas outlet to the divider gas inlet of said gas divider, said gas divider, while having its divider controller means channeling all the gas drawn in from its divider gas inlet to its first divider gas outlet, connecting its first divider gas outlet to the booster inlet of said booster device, and said booster device connecting its booster outlet to said downstream system.

2. The PPSS of claim 1, wherein said control driver is a rigid structure physically connecting said flexible membrane with said divider controller.

3. The PPSS of claim 1, wherein said control driver is a device capable of sensing the movement or shape-change of said flexible membrane electronically or optically, and said propelling instruction is an electronic or optical signal.

4. The PPSS of claim 1, wherein said pressure pilot is open to the atmosphere.

5. The PPSS of claim 1, wherein the surface of said flexible membrane is creased or folded.

6. The PPSS of claim 1, wherein said reflux inlet and said second divider gas outlet are closed.

7. A method for stabilizing a gas source and recycling gas thereof to a downstream system, said method comprising the steps of:

building a pressure stabilizer, said pressure stabilizer comprising a flexible membrane that divides the enclosure of said pressure stabilizer into a receiving chamber and a pressure chamber, said receiving chamber having a source inlet for receiving gas from said gas source, a gas outlet, and a closable reflux inlet, said pressure chamber having a pressure pilot from which a particular fixed pressure is channeled in to make said pressure chamber stable at said fixed pressure, and said flexible membrane is capable of being driven by the pressure difference between said receiving chamber and said pressure chamber and having a movement or shape-change towards the direction of lower pressure;

building a gas divider, said gas divider having a divider gas inlet, a first divider gas outlet, a second divider gas outlet and a divider controller for dividing and channeling any portion, including zero, of gas entered from said divider gas inlet to the first divider gas outlet and the rest to the second divider gas outlet according to a propelling instruction;

building a control driver for sensing the movement or shape-change of said flexible membrane and accordingly providing said divider controller with said propelling instruction;

applying suction power by inter-connecting a booster device having a booster inlet and a booster outlet, said pressure stabilizer, said gas divider and said control driver in either one of the following ways:

(i) connecting the gas outlet of said pressure stabilizer to the booster inlet of said booster device, connecting the booster outlet of said booster device to the divider gas inlet of said gas divider, connecting the first divider gas outlet of said gas divider to said downstream system, and connecting the second divider gas outlet of said gas divider to the reflux inlet of said pressure stabilizer;

(ii) connecting the gas outlet of said pressure stabilizer to the divider gas inlet of said gas divider and channeling all the gas drawn in from divider gas inlet to the first divider gas outlet, connecting the first divider gas outlet to the booster inlet of said booster device, and connecting the booster outlet to said downstream system;

channeling gas from said gas source to the source inlet of said pressure stabilizer.

8. The method of claim 7, wherein said control driver is a rigid structure physically connecting said flexible membrane with said divider controller.

9. The method of claim 7, wherein said control driver is a device capable of sensing the movement or shape-change of said flexible membrane electronically or optically, and said propelling instruction is an electronic or optical signal.

10. The method of claim 7, wherein said pressure pilot is open to the atmosphere.

11. The method of claim 7, wherein the surface of said flexible membrane is creased or folded.

12. The method of claim 7, wherein said reflux inlet and said second divider gas outlet are closed.

* * * * *